United States Patent
Dawson

(10) Patent No.: US 10,230,693 B2
(45) Date of Patent: *Mar. 12, 2019

(54) SAFECHANNEL ENCRYPTED MESSAGING SYSTEM

(71) Applicant: WebCloak, LLC, Irvine, CA (US)

(72) Inventor: Martin Dawson, Laguna Beach, CA (US)

(73) Assignee: WEBCLOAK, LLC, Irvine, CA (US)

(*) Notice: Subject to any disclaimer, the term of this patent is extended or adjusted under 35 U.S.C. 154(b) by 211 days.

This patent is subject to a terminal disclaimer.

(21) Appl. No.: 15/011,080

(22) Filed: Jan. 29, 2016

(65) Prior Publication Data

US 2016/0226834 A1    Aug. 4, 2016

Related U.S. Application Data

(60) Provisional application No. 62/109,526, filed on Jan. 29, 2015.

(51) Int. Cl.
| | |
|---|---|
| *H04L 9/00* | (2006.01) |
| *H04L 29/06* | (2006.01) |
| *G06F 21/31* | (2013.01) |
| *G06F 9/455* | (2018.01) |
| *G06F 21/60* | (2013.01) |

(Continued)

(52) U.S. Cl.
CPC ...... *H04L 63/0428* (2013.01); *G06F 9/45533* (2013.01); *G06F 9/45558* (2013.01); *G06F 21/31* (2013.01); *G06F 21/45* (2013.01); *G06F 21/606* (2013.01); *H04W 12/06* (2013.01); *G06F 2009/45587* (2013.01)

(58) Field of Classification Search
CPC .................................................. H04L 63/0428
USPC ........................................................ 713/164
See application file for complete search history.

(56) References Cited

U.S. PATENT DOCUMENTS

| | | | |
|---|---|---|---|
| 7,788,669 B2 | 8/2010 | England et al. | |
| 7,836,303 B2 | 11/2010 | Levy et al. | |
| 8,086,852 B2 | 12/2011 | Bade et al. | |

(Continued)

FOREIGN PATENT DOCUMENTS

| | | |
|---|---|---|
| CN | 100594503 | 3/2010 |
| WO | 2015078500 A1 | 6/2015 |

*Primary Examiner* — Ashokkumar B Patel
*Assistant Examiner* — Syed M Ahsan
(74) *Attorney, Agent, or Firm* — Fish IP Law, LLC

(57) ABSTRACT

Portable, hand-held electronic devices for and methods to enabling a user to interact with a native operating system (OS) running on a host device and a virtual machine running on top of the native OS are presented. The host device includes a processor to communicate with an application having a target network address. The devices includes an onboard database that stores user credential information and a portable encryption and authentication service module (PPEASM) that allows to make a secure communication channel with the host device. The PPEASM configures the processor to negotiate authentication of the user with an application running on top of the native OS utilizing the user credential information, render an application running on top of the virtual machine, and pass data between the application running on top of the virtual machine and a second application running on top of the native OS.

18 Claims, 4 Drawing Sheets

(51) Int. Cl.
*G06F 21/45* (2013.01)
*H04W 12/06* (2009.01)

(56) References Cited

U.S. PATENT DOCUMENTS

| | | |
|---|---|---|
| 8,572,370 B1 | 10/2013 | Tormasov |
| 8,832,778 B2 | 9/2014 | McCune et al. |
| 8,977,842 B1 * | 3/2015 | McCorkendale ....... G06F 21/53 380/285 |
| 8,996,864 B2 | 3/2015 | Maigne et al. |
| 2006/0130060 A1 † | 6/2006 | Anderson et al. |
| 2008/0147833 A1 † | 6/2008 | Adams et al. |
| 2010/0241868 A1 * | 9/2010 | Nachef ................... G06F 21/31 713/186 |
| 2012/0054741 A1 * | 3/2012 | Ali ........................ H04L 9/3231 718/1 |
| 2012/0089992 A1 * | 4/2012 | Reeves ................. G06F 3/1431 719/318 |
| 2013/0318594 A1 * | 11/2013 | Hoy .................... H04L 63/0272 726/15 |
| 2014/0052994 A1 | 2/2014 | Sabin |
| 2014/0115718 A1 * | 4/2014 | Kellerman .............. G06F 21/60 726/27 |
| 2014/0137115 A1 | 5/2014 | Tosa et al. |

\* cited by examiner
† cited by third party

SAFECHANNEL ENCRYPTED MESSAGING SYSTEM

This application claims priority to our U.S. provisional patent application with the Ser. No. 62/109,526 filed Jan. 29, 2015 which is incorporated by reference herein in its entirety.

FIELD OF THE INVENTION

The field of the invention is encrypted messaging system.

BACKGROUND

The following description includes information that may be useful in understanding the present invention. It is not an admission that any of the information provided herein is prior art or relevant to the presently claimed invention, or that any publication specifically or implicitly referenced is prior art.

Cloud computing and storage solutions enable users to store and process their data in third-party data centers, which allows easy access and sharing of resources, data, and information among computers and other mobile devices. While the users access to the third party data centers or host computers, the users may be exposed potentially hostile environment of the third party data centers or host computers. Further, the users may wish to make a secure communication with the third party data centers or host computers so that the users do not remain any traces in the third party data centers or host computers.

Many technologies have been developed to provide safe and secure communication among various applications, drivers, machines, services and processes. For example, U.S. Pat. No. 8,977,842 to McCorkendale discloses a system using a hypervisor. In this system, the hypervisor manages public and/or private keys and inject keys and encrypted data into a VM to decrypt, which allows for the secure exchange of encrypted data between VMs. However, this system is limited to VM's running on a given hypervisor as it directly injects the data into the VM, rather than using a messaging system.

Others have sought to solve the problem by providing a secure VM to handle transactions between an untrusted VM and a service provider. For example, US Patent application number 2014/0137115 to Tosa discloses that a good VM is used as a proxy for sensitive web communications between a client and a server to secure the communication, and inject the resulting information into the bad VM at a virtualized hardware level. However, this application fails to provide an environment and services for secure communication between applications and VM's.

Others have sought to solve the problem by providing security by isolation. For example, U.S. Patent Application 20130318594 to Hoy discloses a system using a VM and secure tunnel to provide internet access with security by isolation. In this system, the hypervisor is used to provide limited access in and out of the VM for printing, clipboard and file sharing. However, similar to Tosa, this application fails to provide an environment and services for secure communication between applications and VM's.

Thus, there is still a need for an improved systems and methods to facilitate secure communications between processes, servers and VMs.

SUMMARY OF THE INVENTION

The inventive subject matter provides encryption and authentication services in a remote or guest environment using the users' credentials in a portable device and/or application that allows establishment of safechannel between an application running on top of the virtual machine and an application running on top of the native operating system (OS).

One aspect of the invention relates a portable, hand-held electronic device. The hand-held electronic device is configured to be operated in conjunction with a host device running a native operating system (OS). The host device includes a processor to communicate with an application having a target network address, and a native operating system (OS) to run applications. The portable device includes an onboard database and an onboard memory. The onboard database stores user credential information, which can include a password, a challenge phrase, or a challenge phrase hash. In some embodiments, the onboard database further includes a static read-only data volume for certificate storage and a read/write data volume for runtime work.

The onboard memory stores software instructions. When executed by the processor, the instructions cause the processor to negotiate authentication of the user with the application by utilizing the user credential information with an application running on top of the native OS. The instructions further cause the processor to render an application running on top of the virtual machine (e.g., a virtual machine running a secure Linux Kernel, etc.). Then, the instructions cause the processor to pass data between the application running on top of the virtual machine and an application running on top of the native OS. In some embodiments, the instructions further configure the processor to automatically encrypt data before the data is passed from the application running on top of the virtual machine to the application running on top of the native OS.

In a preferred embodiment, the instructions further configure the processor to enable the virtual machine to trap an input/output (i/o) event via an interface of the native OS, and identify a data transfer action between the application running on top of the virtual machine and the application running on top of the native OS based on the trapped i/o event. Then the instructions further configure the processor to trigger the data transfer action via the interface of the native OS.

In some embodiments, the virtual machine has a TCP/IP server having an IP address different from any IP address of the host device. In these embodiments, the software instructions can configure the processor to utilize the TCP/IP server to establish a secured communication channel between the virtual machine and the native OS and pass the data between the application running on top of the virtual machine and the application running on top of the native OS via the secured communication channel.

In some embodiments, the software instructions further configure the processor to provide a user interface (UI) that enables the user to simultaneously interact with the application running on top of the virtual machine and the application running on top of the native OS via the secured communication channel. The UI can be used to detect any i/o events between those application. For example, i/o event comprises a dragging of a cursor on the UI. For another example, the i/o event comprises a dragging of a cursor from a portion of the UI associated with the virtual machine to a portion of the UI associated with the native OS.

Another aspect of the invention includes a computer-implemented method of enabling a user to interact with a native operating system (OS) running on a host device and a virtual machine running on top of the native OS. The method includes steps of 1) causing a processor of the host device having a native OS to instantiate virtual machine running on top of the native OS, 2) rendering an application running on top of the virtual machine, 3) negotiating, by the virtual machine, authentication of the user with another application running on top of the native OS utilizing the user credential information, and 4) passing data between the application running on top of the virtual machine and the application running on top of the native OS via the secured communication channel. In a preferred embodiment, the virtual machine stores user credential information associated with the user, which can include a password, a challenge phrase, and a challenge phrase hash.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
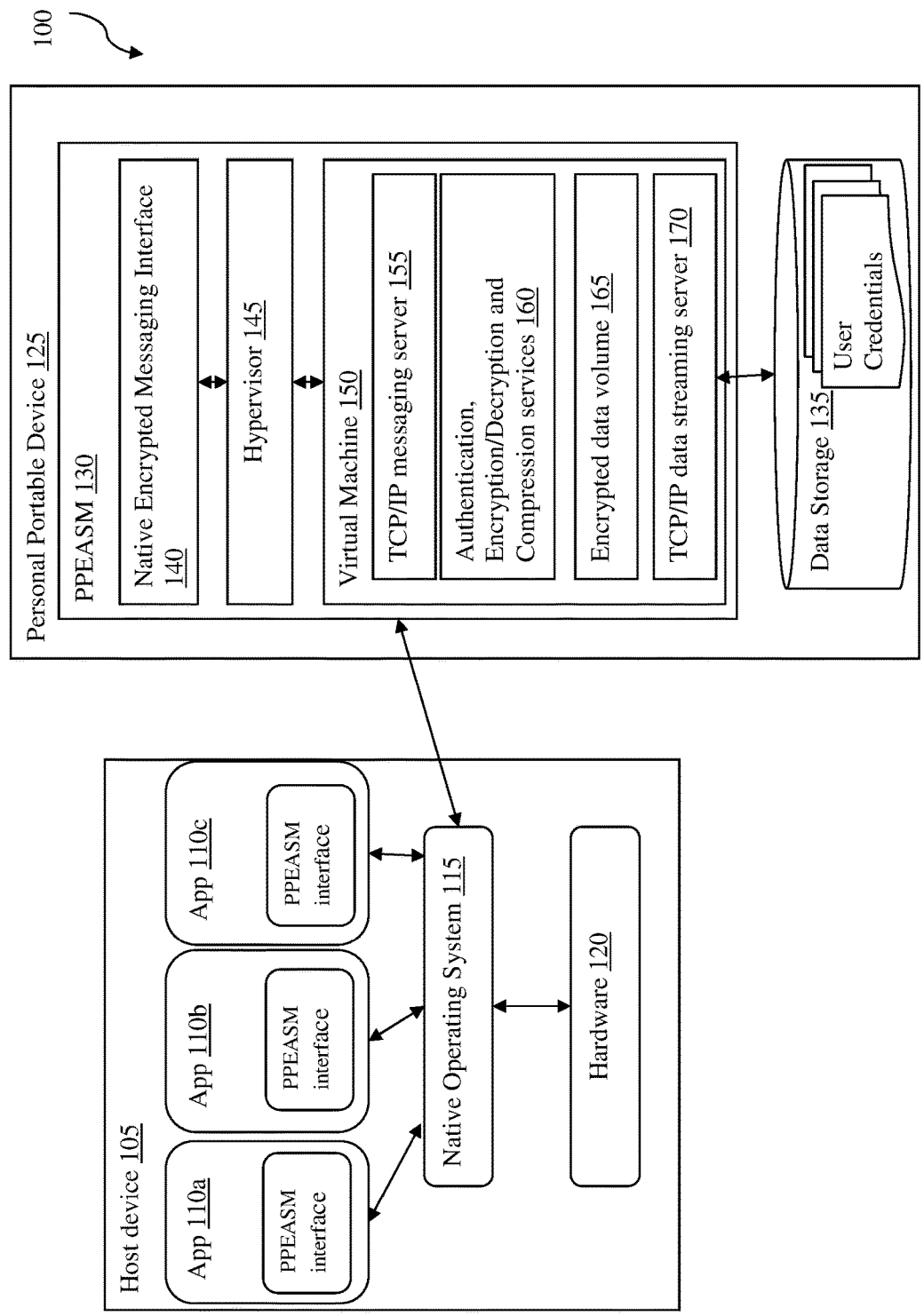
FIG. 1 shows one embodiment of private, portable encryption and authentication service module (PPEASM) in a device communicating with applications in a host computer.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

The terms "configured to" and "programmed to" in the context of a processor refer to being programmed by a set of software instructions to perform a function or set of functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms "coupled to" and "coupled with" are used euphemistically in a networking context to mean "communicatively coupled with" where two or more devices are configured to exchange data (e.g., uni-directionally, bi-directionally, peer-to-peer, etc.) with each other possibly via one or more intermediary devices.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of properties such as dimensions used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One aspect of the present inventive subject matter provides systems and devices that enable a user to seamlessly transfer data between a native operating system (OS) running on a host device and a virtual machine (VM) running on top of the native OS by using a SafeChannel. In some embodiments, the SafeChannel is an encrypted messaging system that allows various application components (e.g., host interfaces, drivers, browser plugins, services, processes and applications, etc.) between the native OS and the VM to communicate securely with each other. For example, the SafeChannel allows secure file transfer between a VM and a native OS. The Safe channel also allows a secure inter-application communications as well as communications in and out of virtual machines. The SafeChannel also allows safe communications through a potentially hostile network by encrypting all data and commands.

One exemplary usage of the SafeChannel is a private portable encryption and authentication service module (PPEASM) that is used to provide a user encryption and authentication services in a remote or guest environment using user credentials, as described in concurrently filed, co-pending application, titled "Private Portable Encryption and Authentication Service Module" that is incorporated by reference herein in its entirety. The remote or guest environment in this disclosure refers to a device that is not under the user's control (e.g., a public computer in a library or a hotel, etc.) and/or a third party's system or database (e.g., a website, a shared directory, etc.). As used herein, a third party's system or database refers to a system or database that is independent to a host device, which can be approachable without passing through the host device's operating system or using the host device's hardware.

Preferably, the PPEASM is a standalone software application that can be stored in the personal, portable devices such as a USB thumb drive or a memory card. However, it is also contemplated that in some embodiments, the PPEASM is a web service or system service that can be provided via a network.

Another advantage of the inventive subject matter includes a device that allows the user to anonymously access and utilize electronics (e.g., processor, memory, etc.) of a host device. In some embodiments, the host device can be a computing device having one or more processor. Preferably, a native operating system (OS) (e.g., Windows, Mac OS, Linux, UNIX, etc.) is already running on the host device.

In a preferred embodiment, the device is a portable, hand-held electronic device (e.g., a thumb drive, a CD-ROM, a cell phone, a smart phone, an iPod, an iPad, etc.). However, in some embodiments, it is also contemplated the device is a built-in device (e.g., a memory, etc) embedded into another device (e.g., a computer, a server, etc.). In these embodiments, the built-in device is independent from the host device.

The device includes an onboard database and an onboard memory (e.g., random access memory, solid state drive, etc.) storing executable version of the software instructions for the PPEASM software application. The onboard database can comprise various types of data volumes. In a preferred embodiment, the onboard database includes a static read-only data volume for certificate storage and a read/write data volume for runtime work.

The onboard database stores user credential information. As used herein, the user credential information includes any information that can be used to authenticate or validate user's identity and/or authority. For example, the user credential information can be any of a password, a challenge phrase, a challenge phrase hash, or a combination of any of those.

In a preferred embodiment, the user credential information is stored exclusively in the onboard database, but not stored in any remote service providers' systems or host devices. More preferably, the user credential information is stored in an encrypted read-only data volume within the onboard database, which is accessible using an encrypted messaging system. Thus, the user credential information is generally not modifiable and safe from the hostile environment that the onboard database may interact with.

FIG. 1 describes an exemplary environment 100 in which the PPEASM application 130 can be operated. The environment 100 includes a personal, portable device 125 (e.g., a USB thumb drive) and a host device 105. The host device can be a generic personal computer that is not under control of a user associated with the personal, portable device 125. The host device 105 usually includes several hardware components 120. For example, the host device 105 can include one or more processors, memory, persistent data storage such as a hard drive or a solid state drive, ports (e.g., USB sockets, etc.) for connecting with external devices, network cards, network interface for connecting the host device 125 to a network (e.g., the Internet, a LAN, etc.), and many others. The host device 105 can also include a native OS 115 (e.g., Windows, Mac OS X, Linux, UNIX, etc.) for managing resources of the host device 105. In addition, the host device 105 can include one or more software applications (e.g., 110a, 110b, 110c, etc.) that run on top of the native OS 115.

In some embodiments, the personal, portable device 125 includes memory that stores an executable version of the software instructions for the PPEASM application 130 and a database 135. When the personal, portable device 125 is connected to the host device 105 (e.g., by plugging the USB thumb drive into a USB socket of the host device 105, etc.), the host device can be triggered to run the PPEASM application 130. In some embodiments, the PPEASM application 130 is triggered to run on top of the native OS 115 of the host device 105.

Once the PPEASM application 130 is triggered to be executed by the processor of the host device 105, the PPEASM application 130 causes the processor to instantiate several modules, engines, or machines to perform functions of the PPEASM application 130. In some embodiments, the PPEASM application 130 causes the processor of the host device 105 to instantiate a native encrypted messaging interface 140, a hypervisor 145, and a virtual machine 150.

In a preferred embodiment, the virtual machine 150 is a kernel-based virtual machine, which includes a secure Linux Kernel. However, it is contemplated that any suitable types of virtual machine (e.g., any type 2 software based virtual machine that runs on a host operating system) such as VMware, Xen, VirtualBox, Qemu, etc.) that is capable to perform the functions described below can be used.

In some embodiments, the virtual machine 150 comprises a Transmission Control Protocol/Internet Protocol (TCP/IP) messaging server 155 and a TCP/IP data streaming server 170. After the TCP/IP messaging server 155 and TCP/IP data streaming server 170 have been instantiated, the virtual machine 150 is programmed to retrieve all of the IP addresses associated with the host device 105 (e.g., IP address associated with the network card of the host device 105, etc.) by interfacing with the native OS 115. In some embodiments, the virtual machine 150 is then programmed to assign network addresses (e.g., IP addresses), that are distinct from any of the IP addresses associated with the host device 105, to the TCP/IP messaging server 155 and to the TCP/IP data streaming server 170. In some embodiments, the IP addresses assigned to TCP/IP messaging server 155 and the TCP/IP data streaming server 170 are identical. However, it is also contemplated that the IP addresses assigned to the TCP/IP messaging server 155 and the TCP/IP data streaming server 170 are different from each other.

The virtual machine 150 also includes an authentication and encryption module 160. The authentication and encryption module 160 is configured to negotiate authentication of user with other applications and provide secured communication between the PPEASM 130 application and the other applications. In some embodiment, instead of storing the user credential information in the data storage 135, the user credential information can be stored within an encrypted data volume 165 of the virtual machine 150.

In some embodiments, the virtual machine 150 can be instantiated, utilized and then unloaded within a limited time or upon the user's action (e.g., request, etc). In some other embodiments, the virtual machine 150 can be instantiated and loaded in a persistent mode to provide ongoing services.

Once the virtual machine 150 is instantiated, the PPEASM 130 further causes the processor 120 to render an encrypted messaging interface 140 on the host device 105. The encrypted messaging interface 140 utilizes the TCP/IP messaging server 155 for communicating between the virtual machine 150 and the applications 110a, 110b, 110c over a TCP/IP networking layer.

In some embodiments, in order to enable the applications 110a, 110b, and 110c to be able to communicate with the virtual machine 150 over the TCP/IP networking layer, an add-on (or a plug-in) must be added to the applications 110a, 110b, and 110c. The add-on or plug-in can be implemented as a PPEASM interface that is programmed to interface with the virtual machine 150 via the TCP/IP messaging server 155 and the TCP/IP data streaming server 170. In some embodiments, the PPEASM interface has a distinct IP address (e.g., a target address) for this communication to occur.

The virtual machine 150 is programmed to interact with the user using a key/value pairs that are delineated using a special character. Through the encrypted messaging interface 140, the PPEASM 130 and the user establishes a secure connection. For example, the user can interact with the PPEASM 130 using a key/value pairs that are delineated using a special character. In a preferred embodiment, the virtual machine 150 comprises an Open SSL, and Rivest-Shamir-Adleman (RSA) Key based authentication method is used to establish the secure connection. In this embodiment, an encryption key is public and a decryption key is secretly kept in the encrypted data volume 165. However, in other embodiments, any suitable type of authentication method using user credential information can be used to establish the secure connection.

If the user credential information is accepted by the virtual machine 150, a token is issued to the virtual machine 150. In a preferred embodiment, the token is time sensitive such that when the token expires, the authentication process should start over.

Generally, the token is common to all transactions (e.g., authentication, hash function, encryption, compression, decryption that the user makes. In this scenario, a transaction ID is issued per each transaction so that the user and the PPEASM 130 can manage multiple transactions for the same client at one time.

As mentioned before, the virtual machine 150 is programmed to allow the user to interact with applications either running on the host device 105 or running on a remote device communicatively coupled with the host device 105. Thus, the virtual machine 150 needs to discover what applications running on top of the native OS 115 or running on other devices over a network. In some embodiments, the virtual machine 150 is programmed to broadcast a signal through its TCP/IP messaging server 155 over the TCP/IP networking layer. The signal includes the IP address that has been assigned to the TCP/IP messaging server 155. When the PPEASM interfaces that have been added onto the applications received such a signal, the PPEASM interfaces are programmed to send a reply to the virtual machine 150 at the IP address included in the broadcast signal. Each reply also includes the IP address that is assigned to the respective PPEASM interface.

Once the secure connection between the user and the virtual machine 150 is established, the virtual machine is programmed to establish a secured communication channel between the virtual machine 150 and the applications 110a, 110b, 110c over the TCP/IP networking layer. In a preferred embodiment, the virtual machine 150 is programmed to send the user credential information to the applications 110a, 110b, 110c to establish a secured communication channel between the virtual machine 150 and the applications 110a, 110b, 110c. In this embodiment, it is also preferred that the user credential information is encrypted by the authentication, encryption, decryption, and compression services module 160 in the virtual machine 150 before being transmitted to the applications 110a, 110b, 110c.

Either automatically upon instantiation, or upon triggered by the user, the virtual machine 150 is programmed to establish a secured data channel with the application 110a via the PPEASM interface associated with the application 110a by negotiating a data encryption protocol. In a preferred embodiment, the virtual machine comprises an Open SSL, and Rivest-Shamir-Adleman (RSA) Key based authentication method is used to establish the secure connection. In this embodiment, an encryption key is public and a decryption key is secretly kept in the encrypted data volume 165. However, in other embodiments, any suitable type of authentication method using user credential information can be used to establish the secure connection. The secured channel allows the virtual machine 150 and the application 110a to transfer encrypted data. In these embodiments, the encrypted messaging interface 140 is responsible for encrypting and decrypting data for the virtual machine 150, while the PPEASM interface is responsible for encrypting and decrypting data for the application 110a.

Once a secured connection between the user and the virtual machine 150 and a secured connection between the virtual machine 150 and the applications 110a, 110b, and 110c are established, the user can begin authentication process with the application by the exchange of user credential information (e.g., challenge phrases) via the encrypted messaging interface 140. In some embodiments, the virtual machine 150 is programmed to negotiate authentication of the user with one of the applications (e.g., applications 110a, 110b, and 110c) so that the user can access the applications. In some embodiments, the virtual machine 150 is programmed to begin the negotiation process by sending an authentication request along with the user credential (e.g., the user credential stored in the data storage 135) to the application 110a. The virtual machine 150 is preconfigured with user credential information (e.g., a unique password, challenge phrase and challenge phrase hash) that is stored in the encrypted data volume 165.

If the user is authenticated, the virtual machine 150 is programmed to instantiate a user interface that enables the user to interact (e.g., access, use, send commends, etc.) with the applications 110a, 110b, and 110c via the virtual machine 150. In a preferred embodiment, the hardware (processor) 120 can generate a plurality of user interface such that a single user interface is specifically used to an individual application 110a, 110b, 110c. In other embodiments, a user interface can be used for more than one application.

Further, the virtual machine 150 is programmed to render an application running on top of the virtual machine 150. Then, the virtual machine is programmed to provide a user interface that allows the user to initiate interactions between applications running on top of the virtual machine 150 and applications running on top of the native OS 115 (e.g., passing data and files between the application running on top of the virtual machine and the application running on top of the native OS, etc.) via the user interface.

As used herein, the data includes any types of digital files, either compressed or uncompressed (e.g., text files, graphic files, audio files, motion picture files, etc.). Further, the data includes object codes, executable files, shared and dynamically linked libraries.

In some embodiments, the virtual machine 150 is programmed to trap a input/output (i/o) event via an interface of the native OS. Based on the trapped i/o event, the virtual machine 150 is programmed to identify a data transfer action between an application running on top of the virtual machine 150 and an application running on the native OS 115. Then, the virtual machine 150 is programmed to initiate the data transfer action via the interface of the native OS.

Various types of i/o event are contemplated. For example, the i/o events includes hardware events from a host device 105 to the VM 150 such as keyboard stroke, mouse movement, or movement of pointers or cursors. The i/o events can also include an action of dragging and dropping of file to the VM 150 through a host interface, or dragging and dropping of file to a host from the VM 150.

The i/o events can also include software events that occurs between the host device 105 and the VM 150. For example, the i/o events can include an action of evoking a Uniform Resource Locater (URL) from a host interface to the VM 150. The i/o events can also include a clipboard function to and from the host device 105 and the VM 150. In addition, the i/o events can include host file directory enumerations, notification of messages (e.g., shutdown of VM, dirty state, lock VM, unlock VM, status of VM, etc.) and transferring encrypted proxy using Socks5.

The i/o events can also include software event that is coupled with a hardware event associated with the host device 105. For example, the i/o events can include an action of printing documents from the VM 150 using a printer associated with the host device 105 over a network without specific knowledge of the printer associated with the host device 105.

In some embodiments, the virtual machine 150 is programmed to provide a user interface (UI) that enables a user to simultaneously interact with the application running on top of the virtual machine 150 and the application running on the native OS 115. For example, a portion of the UI can represent a portion of the host device 105 and another portion of the UI can represent a portion of the VM 150. In this scenario, if the user drags a cursor from a portion of the UI associated with the virtual machine to a portion of the UI associated with the native OS, the user can see the movement of the cursor from a portion of the UI associated with the virtual machine to a portion of the UI associated with the native OS simultaneously, while the cursor movement is securely communicated between the host device 105 and the VM 150 as an encrypted message.

Figure 2:
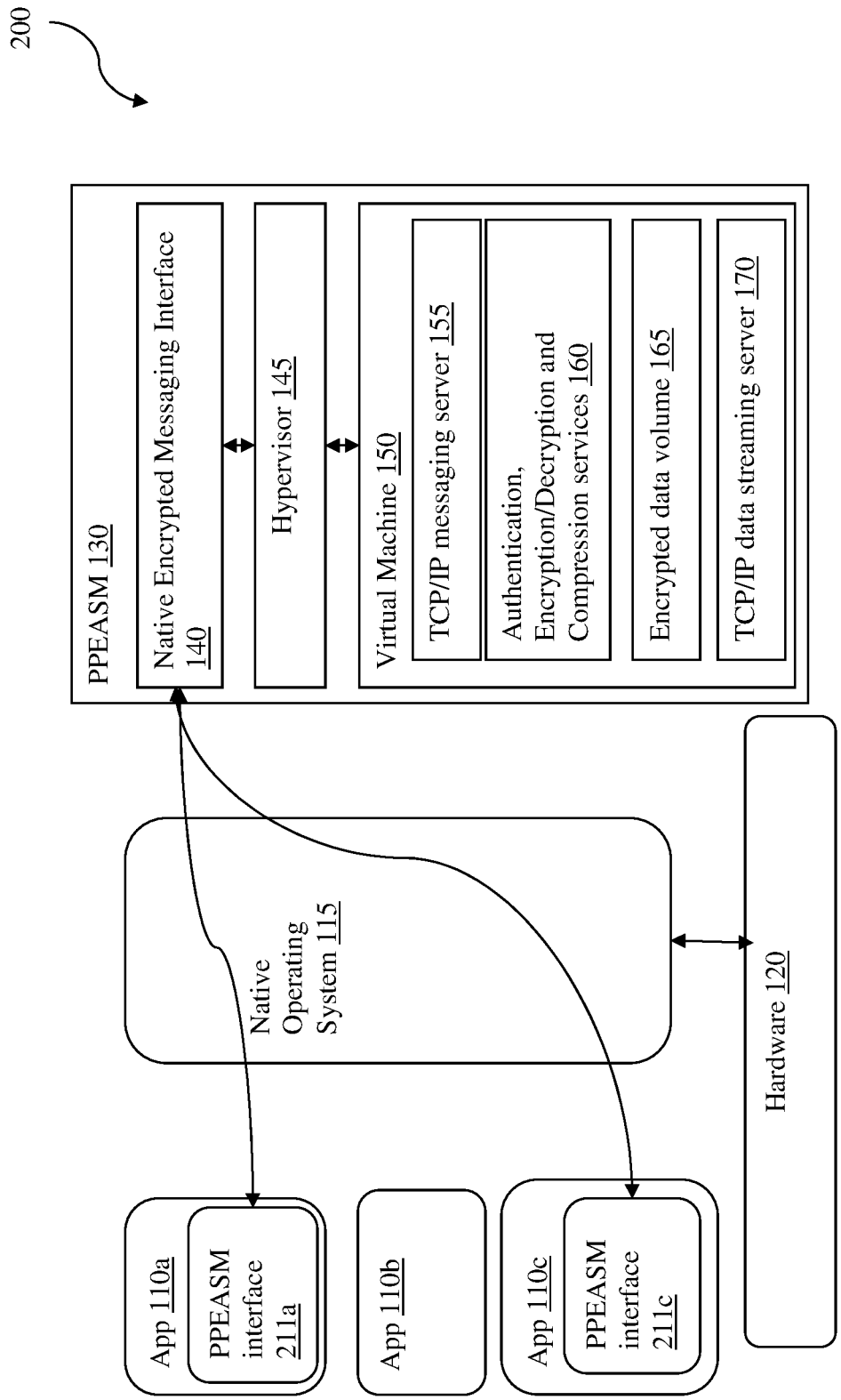
FIG. 2 shows one embodiment of PPEASM in a host computer communicating with applications in the host computer.

As mentioned above, in some embodiments, it is required that the application to have a PPEASM interface in order to communicate with the virtual machine 150. In FIG. 2, since only applications 110a and 110c have the add-ons (PPEASM interfaces 211a and 211c), the virtual machine can communicate with only applications 110a and 110c, but not with application 110b.

FIGS. 1 and 2 illustrate embodiments in which the user interacts with applications that run locally on the host device 105 via the virtual machine 150. However, in some other embodiments, the PPEASM application 130 also allows users to interact with applications that run on a remote computing device that is communicatively coupled with the host device 105.

Figure 3:
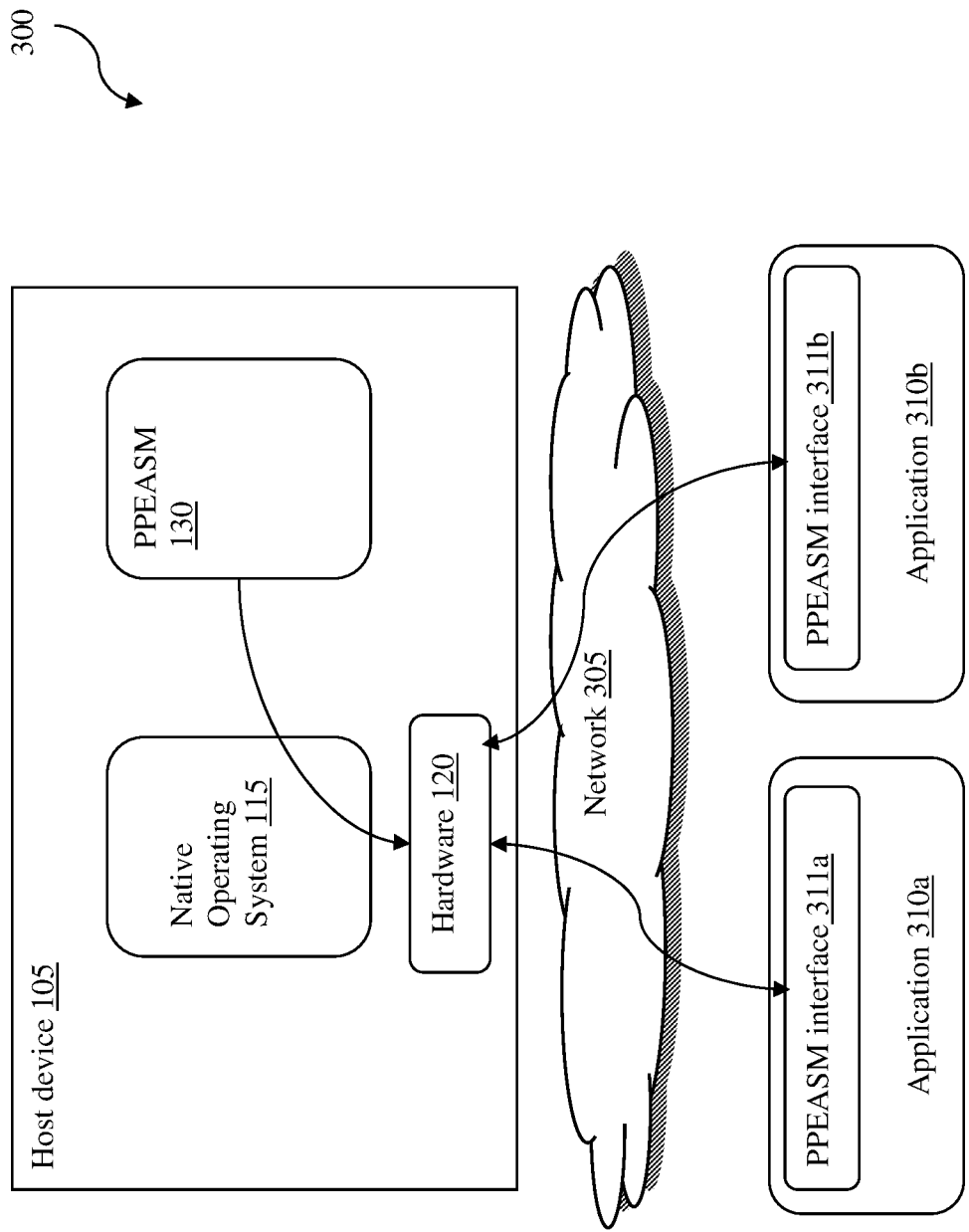
FIG. 3 shows one embodiment of PPEASM in a host computer communicating with applications in a third party system.

FIG. 3 illustrate such an approach. In FIG. 3, environment 300 includes a host device 105 and applications 310a and 310b. The applications 310a and 310b may be running on the same or separate computing device, and are communicatively coupled with the host device 105 over a network 305 (e.g., the Internet, a LAN, etc.). It is also contemplated that the applications 310a, 310b can be a web service or a mobile application. As shown, both applications 310a and 310b have PPEASM interfaces 311a and 311b, respectively for communicating with the virtual machine 150. Using the same method as described above, the virtual machine 150 can establish a secured communication channel with the applications 310a and 310b over a TCP/IP networking layer via the TCP/IP messaging server 155 and the TCP/IP data streaming server 170. The virtual machine 150 can then authenticate the user to access and interact with the applications 310a and 310b using the method described above.

Preferably, when the secure communication channel between the PPEASM 130 and the native operating system 115 is established, the PPEASM 130 can configure the hardware (processor) 120 to establish a secure communication channel with only selected third party applications 310a, 310b having PPEASM interfaces 311a, 311b. It is contemplated that the host device 105 is pre-configured to allow the access from the virtual machine 150 only to a pre-selected third party applications. In this case, the hardware (processor)120 can configure to generate a PPEASM interface only in those pre-selected third party applications.

Figure 4:
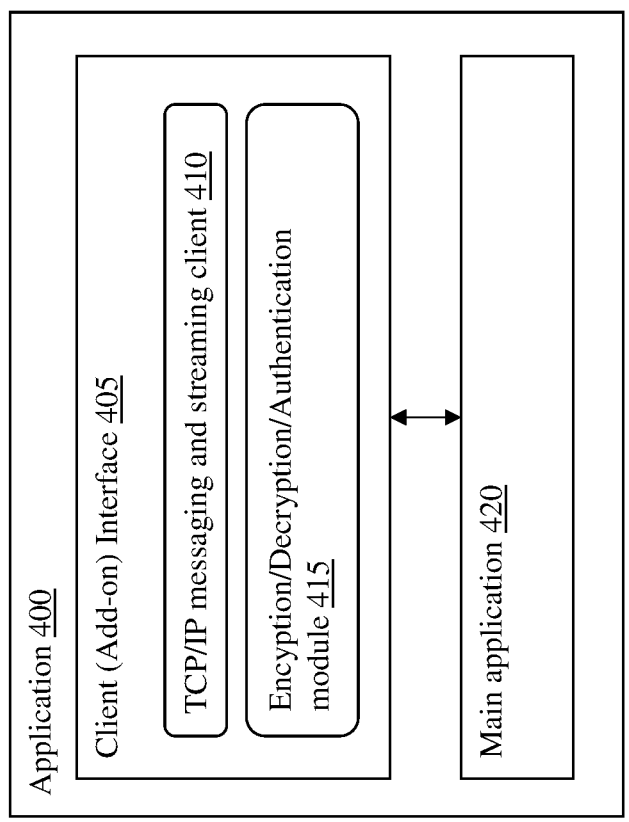
FIG. 4 shows one embodiment of application with a client interface to interact with PPEASM.

FIG. 4 illustrates a schematic of an application 400 having a client interface 405 (e.g., PPEASM interface). Generally, the application communicably coupleable with the PPEASM has a client (add-on) interface 405 and the main application part 420. The client interface 405 includes a TCP/IP messaging and streaming client 410 and a module for encryption, decryption, and authentication 415. The PPEASM communicates with the application 400 through the TCP/IP messaging and streaming client 410.

Generally, the client interface 405 is an add-on software, which can be in the form of a driver, service, static or dynamic library. However, any suitable form of software that can be used as an interface is contemplated.

Another aspect of the inventive subject matter includes a method of enabling a user to interact with a native operating system (OS) running on a host device and a virtual machine running on top of the native OS. The method begins with a step of causing a processor of the host device having a native OS to instantiate virtual machine running on top of the native OS. Generally, the virtual machine stores user credential information associated with the user. Then the method continues with a step of rendering an application running on top of the virtual machine. When the application is rendered, the virtual machine can negotiate authentication of the user with another application running on top of the native OS utilizing the user credential information. Then, the method continues with a step of passing data between the application running on top of the virtual machine and the application running on top of the native OS.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A portable, hand-held electronic device, operable in conjunction with a host device running a native operating system (OS), comprising:
    an onboard database storing user credential information; and
    an onboard memory storing software instructions that, when executed by a processor of the host device, configure the processor to perform the following steps:
    (a) negotiating, by a virtual machine on the portable, hand-held electronic device, authentication of the user utilizing the user credential information residing on the onboard database between a VM application running on the virtual machine on top of the native OS of the host device, and with a host application running on top of the native OS,
    (b) generating, by the virtual machine on the portable, hand-held electronic device, a security token when the virtual machine accepts user credential information from the user, wherein the security token comprises a time-sensitive token and wherein the processor renegotiates authentication of the user when the time-sensitive token expires,
    (c) trapping, by the virtual machine on the portable, hand-held electronic device, i/o events from the native OS,
    (d) encrypting, by an encrypted messaging interface on the portable, hand-held electronic device, a first data from the VM application with the generated security token, and
    (e) passing, by the encrypted messaging interface on the portable, hand-held electronic device, the encrypted first data between the VM application and the host application as a function of the trapped i/o events.

2. The device of claim 1, wherein the software instructions further configure the processor to automatically encrypt a portion of the trapped i/o events and transmit the encrypted portion of the trapped i/o events from the VM application to the host application.

3. The device of claim 1, wherein the software instructions further configure the processor to perform the following steps:
    (a) identifying a data transfer action between the VM application and the host application based on a portion of the trapped i/o events, and
    (b) triggering the data transfer action via the interface of the native OS.

4. The device of claim 1, wherein the software instructions that, when executed by the processor of the host device, configure the processor issue a transaction ID for each transaction associated with the time-sensitive token, wherein each transaction is assigned a unique transaction ID that allows the portable, hand-held electronic device to manage multiple transactions for the user at substantially the same time.

5. The device of claim 1, wherein the software instructions further configure the processor to provide a user interface (UI) that enables the user to simultaneously interact with the VM and host applications.

6. The device of claim 5, wherein the i/o event comprises a dragging of a cursor on the UI.

7. The device of claim 6, wherein the i/o event comprises a dragging of a cursor from a portion of the UI associated with the virtual machine to a portion of the UI associated with the native OS.

8. The device of claim 1, wherein the host application comprises a web browser, and wherein the web browser comprises an encryption and authentication applet that authenticates the user with the host application.

9. The device of claim 1, wherein the authentication of the user comprises encrypting a challenge phrase with a public encryption key and sending the encrypted challenge phrase to a Rivest-Shamir-Adleman (RSA) key-based authentication module.

10. A method of enabling a user to interact with a native operating system (OS) running on a host device and a virtual machine running on top of the native OS, comprising:
    causing a processor of the host device having a native OS to instantiate the virtual machine running on top of the native OS, wherein the virtual machine stores user credential information associated with the user;
    rendering, by a virtual machine on a portable, hand-held electronic device, a VM application running on top of the virtual machine;
    negotiating, by the virtual machine on the portable, hand-held electronic device, authentication of the user with a host application running on top of the native OS utilizing the user credential information;
    generating, by the virtual machine on the portable, hand-held electronic device, a security token when the virtual machine accepts user credential information from the user, and wherein the security token comprises a time-sensitive token and wherein the processor renegotiates authentication of the user when the time-sensitive token expires; and passing, by an encrypted messaging interface on the portable, hand-held electronic device, data between the VM application and the host application using the generated security token as a function of the trapped i/o events.

11. The method of claim 1, further comprising automatically encrypting trapped i/o events from the native OS and transmitting the encrypted trapped i/o events to the host application.

12. The method of claim 10, further comprising:
trapping, by the virtual machine, an input/output (i/o) event via an interface of the native OS;
identifying a data transfer action between the VM application and a host application running on the native OS based on the trapped i/o event; and
triggering the data transfer action via the interface of the native OS.

13. The method of claim 10 further comprising issuing a transaction ID for each transaction associated with the time-sensitive token, wherein each transaction is assigned a unique transaction ID that allows the portable, hand-held electronic device to manage multiple transactions for the user at substantially the same time.

14. The method of claim 10, further comprising providing a user interface (UI) that enables the user to simultaneously interact with the VM and host applications.

15. The method of claim 14, wherein the i/o event comprises a dragging of a cursor on the UI.

16. The method of claim 15, wherein the i/o event comprises a dragging of a cursor from a portion of the UI associated with the virtual machine to a portion of the UI associated with the native OS.

17. The method of claim 10, wherein the security token comprises a hash of the exchanged challenge phrases.

18. The device of claim 10, wherein the authentication of the user comprises encrypting a challenge phrase with a public encryption key and sending the encrypted challenge phrase to a Rivest-Shamir-Adleman (RSA) key-based authentication module.

* * * * *